(12) United States Patent
Gao et al.

(10) Patent No.: US 11,483,823 B2
(45) Date of Patent: *Oct. 25, 2022

(54) DATA TRANSMISSION METHOD, TERMINAL AND BASE STATION

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/476,384

(22) PCT Filed: Feb. 7, 2018

(86) PCT No.: PCT/CN2018/075579
§ 371 (c)(1),
(2) Date: Jul. 8, 2019

(87) PCT Pub. No.: WO2018/127230
PCT Pub. Date: Jul. 12, 2018

(65) Prior Publication Data
US 2020/0068566 A1 Feb. 27, 2020

(30) Foreign Application Priority Data

Jun. 1, 2017 (CN) .......................... 201710010575.5

(51) Int. Cl.
*H04W 72/12* (2009.01)
*H04W 72/04* (2009.01)
*H04W 72/14* (2009.01)

(52) U.S. Cl.
CPC ..... *H04W 72/0446* (2013.01); *H04W 72/042* (2013.01); *H04W 72/1268* (2013.01); *H04W 72/14* (2013.01)

(58) Field of Classification Search
CPC ........... H04W 72/0446; H04W 72/042; H04W 72/1268; H04W 72/14
See application file for complete search history.

(56) References Cited

U.S. PATENT DOCUMENTS

2014/0036853 A1 2/2014 Kim et al.
2015/0063179 A1 3/2015 Yang et al.
(Continued)

FOREIGN PATENT DOCUMENTS

| | | |
|---|---|---|
| CN | 102695276 A | 9/2012 |
| CN | 103650393 A | 3/2014 |

(Continued)

OTHER PUBLICATIONS

First Office Action from TW app. No. 107104458, dated Jan. 7, 2019, with machine English translation.
(Continued)

*Primary Examiner* — Candal Elpenord
(74) *Attorney, Agent, or Firm* — Ladas & Parry, LLP

(57) ABSTRACT

A data transmission method, a terminal and a base station are provided by the present disclosure. The data transmission method of the present disclosure includes: receiving a downlink control channel carrying an indication field, wherein the indication field is used for indicating a time domain resource of a target transmission corresponding to the downlink control channel, and/or division of uplink resources and downlink resources in a target time unit in which the target transmission is located; determining the time domain resource of the target transmission corresponding to the (Continued)

downlink control channel, according to the indication field; and transmitting data on the time domain resource.

16 Claims, 4 Drawing Sheets

(56) References Cited

U.S. PATENT DOCUMENTS

| | | | |
|---|---|---|---|
| 2015/0312905 A1 | 10/2015 | Seo et al. | |
| 2016/0095114 A1 | 3/2016 | Kim et al. | |
| 2017/0135105 A1* | 5/2017 | Li | H04W 72/12 |
| 2018/0049164 A1* | 2/2018 | Wu | H04W 72/12 |
| 2018/0323935 A1* | 11/2018 | Yerramalli | H04W 74/0808 |
| 2018/0343665 A1* | 11/2018 | Yan | H04W 72/0453 |
| 2019/0037588 A1* | 1/2019 | Yan | H04L 27/0006 |
| 2019/0052447 A1 | 2/2019 | Wan et al. | |
| 2019/0081765 A1 | 3/2019 | Si et al. | |
| 2019/0379516 A1* | 12/2019 | Horiuchi | H04L 5/0094 |
| 2020/0008103 A1* | 1/2020 | Lin | H04L 5/0048 |
| 2020/0100275 A1* | 3/2020 | Tang | H04W 72/04 |
| 2020/0267694 A1* | 8/2020 | Zhang | H04W 74/0808 |

FOREIGN PATENT DOCUMENTS

| | | |
|---|---|---|
| CN | 104115421 A | 10/2014 |
| CN | 105099634 A | 11/2015 |
| CN | 102695276 B * | 2/2017 |
| WO | 2017167146 A1 | 10/2017 |
| WO | 2017181874 A1 | 10/2017 |

OTHER PUBLICATIONS

Written Opinion of the International Searching Authority and International Search Report from PCT/CN2018/075579, dated Mar. 27, 2018, with English translation from WIPO.
International Preliminary Report on Patentability from PCT/CN2018/075579, dated Jul. 9, 2019, with English translation from WIPO.
"NR scheduling procedure", R1-1608795, 3GPP TSG RAN WG1 Meeting #86bis, Lisbon, Portugal, Oct. 10-14, 2016.
"NR UL control channel structure", R1-1611394, 3GPP TSG RAN WG1 Meeting #87, Reno, USA, Nov. 14-18, 2016.

* cited by examiner

DATA TRANSMISSION METHOD, TERMINAL AND BASE STATION

CROSS-REFERENCE TO RELATED APPLICATIONS

The present application is the U.S. national phase application of PCT Application No. PCT/CN2018/075579 filed on Feb. 7, 2018, which claims a priority to Chinese Patent Application No. 201710010575.5 filed with the Chinese Patent Office on Jan. 6, 2017, the entire disclosures of which are incorporated herein by reference in their entireties.

TECHNICAL FIELD

The present disclosure relates to the technical field of communications, and in particular to a data transmission method, a terminal and a base station.

BACKGROUND

With the development and change of demands for mobile communication services, organizations such as the International Telecommunication Union (ITU) and the 3GPP have begun to conduct research on new wireless communication systems (such as 5G systems). The new wireless communication system can support a coexistence of multiple service types, such as an Enhanced Mobile Broadband (eMBB) service, an Ultra Reliable and Low Latency Communication (URLLC) service and a Massive Machine-Type of Communication (mMTC). In addition, the traffics of the same type of service may also change. In order to support different service types and flexible and variable traffics, a transmission structure, such as a full downlink slot, a full uplink slot, a partial downlink and partial uplink slot, may be adopted. The partial downlink and partial uplink slot may further include a downlink-dominant slot and an uplink-dominant slot. Currently, there is no solution for transmission in a variable slot structure.

SUMMARY

The present disclosure aims to provide a data transmission method, a terminal and a base station, with the purpose of solving the problem of realizing transmission in a variable slot structure which is not addressed in the related art.

In order to achieve the above object, a data transmission method is provided according to an embodiment of the present disclosure, which is applied to a terminal. The method includes:

receiving a downlink control channel carrying an indication field, wherein the indication field is used for indicating a time domain resource of a target transmission corresponding to the downlink control channel, and/or division of uplink resources and downlink resources in a target time unit in which the target transmission is located;

determining the time domain resource of the target transmission corresponding to the downlink control channel, according to the indication field; and transmitting data on the time domain resource.

The indication field is only used for indicating the time domain resource of the target transmission corresponding to the downlink control channel;

the step of determining the time domain resource of the target transmission corresponding to the downlink control channel according to the indication field includes:

taking the time domain resource indicated by the indication field as the time domain resource of the target transmission corresponding to the downlink control channel.

The indication field is only used for indicating division of uplink resources and downlink resources in the target time unit in which the target transmission is located;

the step of determining the time domain resource of the target transmission corresponding to the downlink control channel according to the indication field includes:

determining an uplink resource and/or a downlink resource in the target time unit in which the target transmission is located, according to the indication field; and taking all or part of the uplink resources or the downlink resources as the time domain resource of the target transmission; or taking all or part of resources pre-agreed or configured for data transmission in the uplink resources or the downlink resources, as the time domain resource of the target transmission.

The indication field is used for indicating the time domain resource of the target transmission corresponding to the downlink control channel, and indicating division of uplink resources and downlink resources in the target time unit in which the target transmission is located;

the step of determining the time domain resource of the target transmission corresponding to the downlink control channel according to the indication field includes:

taking the time domain resource indicated by the indication field as the time domain resource of the target transmission corresponding to the downlink control channel; or determining an uplink resource and/or a downlink resource in the target time unit in which the target transmission is located, according to the indication field, and taking all or part of the uplink resources or the downlink resources as the time domain resource of the target transmission; or taking all or part of resources pre-agreed or configured for data transmission in the uplink resources or the downlink resources, as the time domain resource of the target transmission; or determining the time domain resource of the target transmission according to the time domain resource indicated by the indication field and the division of uplink resources and downlink resources in the target time unit.

The step of determining the time domain resource of the target transmission according to the time domain resource indicated by the indication field and the division of uplink resources and downlink resources in the target time unit includes:

taking a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or taking a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or when the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then taking the time domain resource indicated by the indication field as the time domain resource of the target transmission; or when the time domain resource indicated by the indication field exceeds the size of the uplink resource or the downlink resource determined according to the indication field, then taking the uplink resource or the downlink resource as the time domain resource of the target transmission, or taking the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or when the time domain resource indicated by the indication field exceeds the size of an area pre-agreed or configured for data transmission in the uplink resource or the downlink resource determined according to the indication field, then taking the area pre-agreed or configured for data transmission in the uplink resource or the downlink resource as the time domain resource of the target transmission, or taking the time domain resource indicated by the indication field as the time domain resource of the target transmission, or taking a maximum value, a minimum value, an intersection set or a union set of the area pre-agreed or configured for data transmission in the uplink resource or the downlink resource and the time domain resource indicated by the indication field as the time domain resource of the target transmission.

Specifically, the target transmission corresponding to the downlink control channel includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

The target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

The division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

The structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

The target time unit is a pre-defined or pre-configured unit including D1 sub-frames, D2 slots, D3 mini-slots or D4 symbols, wherein D1, D2, D3 and D4 are integers greater than or equal to 1.

A data transmission method is further provided according to an embodiment of the present disclosure, which is applied to a base station. The method includes:

transmitting a downlink control channel carrying an indication field, wherein the indication field is used for indicating a time domain resource of a target transmission corresponding to the downlink control channel, and/or indicating division of uplink resources and downlink resources in a target time unit in which the target transmission is located;

determining the time domain resource of the target transmission corresponding to the downlink control channel, according to the indication field; and transmitting data on the time domain resource.

The indication field is only used for indicating the time domain resource of the target transmission corresponding to the downlink control channel;

the step of determining the time domain resource of the target transmission corresponding to the downlink control channel according to the indication field includes:

taking the time domain resource indicated by the indication field as the time domain resource of the target transmission corresponding to the downlink control channel.

The indication field is only used for indicating division of uplink resources and downlink resources in the target time unit in which the target transmission is located;

the step of determining the time domain resource of the target transmission corresponding to the downlink control channel according to the indication field includes:

determining an uplink resource and/or a downlink resource in the target time unit in which the target transmission is located, according to the indication field; and taking all or part of the uplink resources or the downlink resources as the time domain resource of the target transmission; or taking all or part of resources pre-agreed or configured for data transmission in the uplink resources or the downlink resources, as the time domain resource of the target transmission.

The indication field is used for indicating the time domain resource of the target transmission corresponding to the downlink control channel, and indicating division of uplink resources and downlink resources in the target time unit in which the target transmission is located;

the step of determining the time domain resource of the target transmission corresponding to the downlink control channel according to the indication field includes:

taking the time domain resource indicated by the indication field as the time domain resource of the target transmission corresponding to the downlink control channel; or determining an uplink resource and/or a downlink resource in the target time unit in which the target transmission is located, according to the indication field, and taking all or part of the uplink resources or the downlink resources as the time domain resource of the target transmission; or taking all or part of resources pre-agreed or configured for data transmission in the uplink resources or the downlink resources, as the time domain resource of the target transmission; or determining the time domain resource of the target transmission according to the time domain resource indicated by the indication field and the division of uplink resources and downlink resources in the target time unit.

The step of determining the time domain resource of the target transmission according to the time domain resource indicated by the indication field and the division of uplink resources and downlink resources in the target time unit includes:

taking a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or taking a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or when the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then taking the time domain resource indicated by the indication field as the time domain resource of the target transmission; or when the time domain resource indicated by the indication field exceeds the size of the uplink resource or the downlink resource determined according to the indication field, then taking the uplink resource or the downlink resource as the time domain resource of the target transmission, or taking the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or when the time domain resource indicated by the indication field exceeds the size of an area pre-agreed or configured for data transmission in the uplink resource or the downlink resource determined according to the indication field, then taking the area pre-agreed or configured for data transmission in the uplink resource or the downlink resource as the time domain resource of the target transmission, or taking the time domain resource indicated by the indication field as the time domain resource of the target transmission, or taking a maximum value, a minimum value, an intersection set or a union set of the area pre-agreed or configured for data transmission in the uplink resource or the downlink resource and the time domain resource indicated by the indication field as the time domain resource of the target transmission.

Specifically, the target transmission corresponding to the downlink control channel includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

The target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

The division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

The structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

The target time unit is a pre-defined or pre-configured unit including D1 sub-frames, D2 slots, D3 mini-slots or D4 symbols, wherein D1, D2, D3 and D4 are integers greater than or equal to 1.

A terminal is further provided according to an embodiment of the present disclosure. The terminal includes:

a receiving module, configured to receive a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a first determining module, configured to determine the time domain resource of the target transmission corresponding to the downlink control channel, according to the indication field; and a first transmission module, configured to transmit data on the time domain resource.

The indication field is only used for indicating the time domain resource of the target transmission corresponding to the downlink control channel;

the first determining module includes:

a first determining sub-module, configured to take the time domain resource indicated by the indication field as the time domain resource of the target transmission corresponding to the downlink control channel.

The indication field is only used for indicating division of uplink resources and downlink resources in the target time unit in which the target transmission is located;

the first determining module includes:

a second determining sub-module, configured to determine an uplink resource and/or a downlink resource in the target time unit in which the target transmission is located, according to the indication field; and a third determining sub-module, configured to take all or part of the uplink resources or the downlink resources as the time domain resource of the target transmission; or take all or part of resources pre-agreed or configured for data transmission in the uplink resources or the downlink resources, as the time domain resource of the target transmission.

The indication field is used for indicating the time domain resource of the target transmission corresponding to the downlink control channel, and indicating division of uplink resources and downlink resources in the target time unit in which the target transmission is located;

the first determining module includes:

a fourth determining sub-module, configured to take the time domain resource indicated by the indication field as the time domain resource of the target transmission corresponding to the downlink control channel; or a fifth determining sub-module, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or configured for data transmission in the uplink resources or the downlink resources, as the time domain resource of the target transmission; or a sixth determining sub-module, configured to determine the time domain resource of the target transmission according to the time domain resource indicated by the indication field and the division of uplink resources and downlink resources in the target time unit.

The sixth determining sub-module includes:

a first determining unit, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or, a second determining unit, configured to take a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or a third determining unit configured to: when the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then take the time domain resource indicated by the indication field as the time domain resource of the target transmission; or a fourth determining unit configured to: when the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or take a maximum value, a minimum value, an intersection set or a union set of the uplink resource or the downlink resource and the time domain resource indicated by the indication field as the time domain resource of the target transmission; or a fifth determining unit configured to: when the time domain resource indicated by the indication field exceeds the size of an area pre-agreed or configured for data transmission in the uplink resource or the downlink resource determined according to the indication field, then take the area pre-agreed or configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or configured for data transmission in the uplink resource or the downlink resource and the time domain resource indicated by the indication field as the time domain resource of the target transmission.

Specifically, the target transmission corresponding to the downlink control channel includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

The target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

The division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

The structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

The target time unit is a pre-defined or pre-configured unit including D1 sub-frames, D2 slots, D3 mini-slots or D4 symbols, wherein D1, D2, D3 and D4 are integers greater than or equal to 1.

A base station is further provided according to an embodiment of the present disclosure. The base station includes:

a transmitting module, configured to transmit a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a second determining module, configured to determine the time domain resource of the target transmission corresponding to the downlink control channel, according to the indication field; and a second transmission module, configured to transmit data on the time domain resource.

The indication field is only used for indicating the time domain resource of the target transmission corresponding to the downlink control channel;

the second determining module includes:

a seventh determining sub-module, configured to take the time domain resource indicated by the indication field as the time domain resource of the target transmission corresponding to the downlink control channel.

The indication field is only used for indicating division of uplink resources and downlink resources in the target time unit in which the target transmission is located;

the second determining module includes:

an eighth determining sub-module, configured to determine an uplink resource and/or a downlink resource in the target time unit in which the target transmission is located, according to the indication field; and a ninth determining sub-module, configured to take all or part of the uplink resources or the downlink resources as the time domain resource of the target transmission; or take all or part of resources pre-agreed or configured for data transmission in the uplink resources or the downlink resources, as the time domain resource of the target transmission.

The indication field is used for indicating the time domain resource of the target transmission corresponding to the downlink control channel, and indicating division of uplink resources and downlink resources in the target time unit in which the target transmission is located;

the second determining module includes:

a tenth determining sub-module, configured to take the time domain resource indicated by the indication field as the time domain resource of the target transmission corresponding to the downlink control channel; or an eleventh determining sub-module, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or configured for data transmission in the uplink resources or the downlink resources, as the time domain resource of the target transmission; or a twelfth determining sub-module, configured to determine the time domain resource of the target transmission according to the time domain resource indicated by the indication field and the division of uplink resources and downlink resources in the target time unit.

The twelfth determining sub-module includes:

a sixth determining unit, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or a seventh determining unit, configured to take a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or, an eighth determining unit configured to: when the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then take the time domain resource indicated by the indication field as the time domain resource of the target transmission; or a ninth determining unit configured to: when the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or take a maximum value, a minimum value, an intersection set or a union set of the uplink resource or the downlink resource and the time domain resource indicated by the indication field as the time domain resource of the target transmission; or a tenth determining unit configured to: when the time domain resource indicated by the indication field exceeds the size of an area pre-agreed or configured for data transmission in the uplink resource or the downlink resource determined according to the indication field, then take the area pre-agreed or configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or configured for data transmission in the uplink resource or the downlink resource and the time domain resource indicated by the indication field as the time domain resource of the target transmission.

Specifically, the target transmission corresponding to the downlink control channel includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

The target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

The time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

The division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

The structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

The target time unit is a pre-defined or pre-configured unit including D1 sub-frames, D2 slots, D3 mini-slots or D4 symbols, wherein D1, D2, D3 and D4 are integers greater than or equal to 1.

A terminal is further provided according to an embodiment of the present disclosure. The terminal includes a transceiver, a processor and a memory. The processor is configured to execute a computer program stored in the memory so as to: receive, by the transceiver, a downlink control channel carrying an indication field, wherein the indication field is used for indicating a time domain resource of a target transmission corresponding to the downlink control channel, and/or indicating division of uplink resources and downlink resources in a target time unit in which the target transmission is located; determine the time domain resource of the target transmission corresponding to the downlink control channel, according to the indication field; and transmit data on the time domain resource.

A base station is further provided according to an embodiment of the present disclosure. The base station includes a transceiver, a processor and a memory. The processor is configured to execute a computer program stored in the memory so as to: transmit, by the transceiver, a downlink control channel carrying an indication field, wherein the indication field is used for indicating a time domain resource of a target transmission corresponding to the downlink control channel, and/or indicating division of uplink resources and downlink resources in a target time unit in which the target transmission is located; determine the time domain resource of the target transmission corresponding to the downlink control channel, according to the indication field; and transmit data on the time domain resource.

A computer readable storage medium is further provided according to an embodiment of the present disclosure, on which computer programs are stored. When being executed by a processor, the computer programs implement any one of the above data transmission methods applied to a terminal.

A computer readable storage medium is further provided according to an embodiment of the present disclosure, on which computer programs are stored. When being executed by a processor, the computer programs implement any one of the above data transmission methods applied to a base station.

The embodiments of the present disclosure have the following advantageous effects.

With the foregoing technical solutions of the embodiments of the present disclosure, the object of realizing transmission in a variable slot structure is achieved by: receiving a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

DETAILED DESCRIPTION

Hereinafter, the present disclosure will be described in detail in connection with specific embodiments and accompanying drawings, so that the technical problems to be solved by the present disclosure, the technical solutions and advantages of the present disclosure will become clearer.

In a data transmission method according to an embodiment of the present disclosure, a time domain resource of a target transmission corresponding to a downlink control channel is determined according to indication field used for indicating a time domain resource of a target transmission corresponding to the downlink control channel, and/or indicating division of uplink resources and downlink resources in a target time unit in which the target transmission is located, so that the object of realizing data transmission on a determined time domain resource is achieved.

First Embodiment

Figure 1:
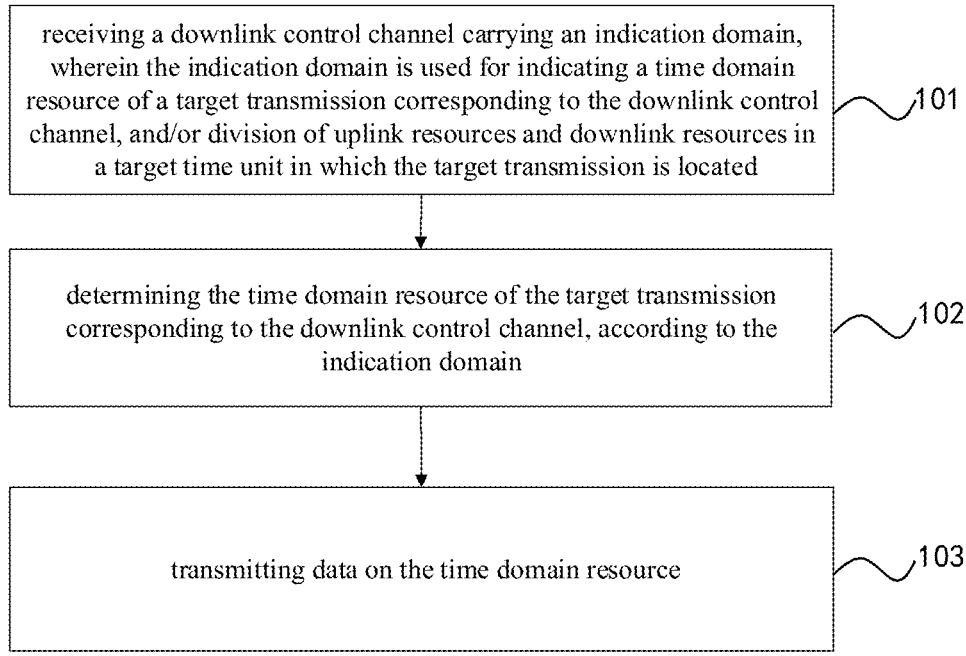
FIG. 1 is a first workflow diagram of a data transmission method according to an embodiment of the present disclosure.

As shown in FIG. 1, a data transmission method is provided according to an embodiment of the present disclosure, which is applied to a terminal. The method includes steps 101 to 103.

In step 101, a downlink control channel carrying an indication field is received, wherein the indication field is used for indicating a time domain resource of a target transmission corresponding to the downlink control channel, and/or indicating division of uplink resources and downlink resources in a target time unit in which the target transmission is located.

In this step, the downlink control channel is a downlink control channel using an uplink DCI format (i.e., a downlink control channel carrying an uplink scheduling grant, that is, an uplink scheduling instruction (UL grant)) and/or a downlink control channel using a downlink DCI format (i.e., a downlink control channel carrying a downlink scheduling grant, that is, a downlink scheduling instruction (DL grant), including a downlink control channel indicating a release of a short downlink semi-persistent scheduling (SPS) resource).

Herein, the time domain resource of the target transmission corresponding to the downlink control channel is acquired by receiving the downlink control channel carrying the indication field.

In step 102, the time domain resource of the target transmission corresponding to the downlink control channel is determined according to the indication field.

In this step, the target transmission corresponding to the downlink control channel specifically includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

The target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

Further, the time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

Further, the division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

The resource size refers to the number of symbols or mini-slots or slots or sub-frames as included, and the location refers to the index or numbering of symbols or mini-slots or slots or sub-frames as included.

The above structure type includes at least one of the following structure types:

a first structure type in which symbols or mini-slots in the target time unit are all used for uplink transmission; a second structure type in which symbols or mini-slots in the target time unit are all used for downlink transmission; and a third structure type in which first partial symbols or first partial mini-slots in the target time unit are used for uplink transmission, while second partial symbols or second partial mini-slots in the target time unit are used for downlink transmission.

Further, the target time unit is a pre-defined or pre-configured unit including D1 sub-frames, D2 slots, D3 mini-slots or D4 symbols, wherein D1, D2, D3 and D4 are integers greater than or equal to 1.

In a specific embodiment of the present disclosure, when the downlink control channel is a downlink control channel using an uplink DCI format, the transmission corresponding to the downlink control channel is an uplink shared channel transmission scheduled by the uplink control channel. The uplink shared channel scheduled by the uplink control channel is transmitted in in a current time unit, or an A1-th time unit after the current time unit, or A2 continuous time units starting from the current time unit, or A3 continuous time units after the current time unit, wherein each of A1, A2 and A3 is an integer greater than or equal to 1, and A1, A2 and A3 are pre-agreed and pre-configured, or A1, A2, and A3 are determined according to the indication field in the downlink control channel using the uplink DCI format, wherein the current time unit is a time unit in which the downlink control channel transmission is located.

When the downlink control channel is a downlink control channel using a downlink DCI format:

the transmission corresponding to the downlink control channel is an ACK/NACK feedback transmission corresponding to a downlink shared channel scheduled by the downlink control channel or an ACK/NACK feedback transmission corresponding to the downlink control channel itself. The ACK/NACK feedback is transmitted in a current time unit, or a B1-th time unit after the current time unit, or B2 continuous time units starting from the current time unit, or B3 continuous time units after the current time unit, wherein each of B1, B2 and B3 is an integer greater than or equal to 1, and B1, B2 and B3 are pre-agreed and pre-configured, or B1, B2, and B3 are determined according to the indication field in the downlink control channel using the downlink DCI format, wherein the current time unit is a time unit in which the downlink control channel transmission is located; or the transmission corresponding to the downlink control channel is a downlink shared channel transmission scheduled by the downlink control channel, wherein the downlink shared channel is transmitted in a current time unit, or a C1-th time unit after the current time unit, or C2 continuous time units starting from the current time unit, or C3 continuous time units after the current time unit, wherein each of C1, C2 and C3 is an integer greater than or equal to 1, and C1, C2 and C3 are pre-agreed and pre-configured, or C1, C2 and C3 are determined according to the indication field in the downlink control channel using the downlink DCI format, wherein the current time unit is a time unit in which the downlink control channel transmission is located.

The above time unit is defined as D1 sub-frames, or D2 slots, or D3 mini-slots, or D4 symbols, wherein D1, D2, D3, and D4 are integers greater than or equal to 1.

Specifically, the symbols in the embodiment of the present disclosure may be Orthogonal Frequency Division Multiplexing (OFDM) symbols or Single Carrier-Frequency Division Multiple Access (SC-FDMA) symbols, and of course can also be other orthogonal multiple access symbols, such as Pattern Division Multiple Access (PDMA) symbols, Sparse Code Multiplexing Access (SCMA) symbols, Filtered Orthogonal Frequency Division Multiplexing (F-OFDM) symbols, Non-Orthogonal Multiple Access (NOMA) symbols and Cyclic Prefix-OFDM (CP-OFDM) symbols.

Further, in a case where the above indication field is only used for indicating the time domain resource of the target transmission corresponding to the downlink control channel, the above step 102 specifically includes: taking the time domain resource indicated by the indication field as the time domain resource of the target transmission corresponding to the downlink control channel.

Herein, the indication field is used for indicating the time domain resource of the target transmission corresponding to the downlink control channel. The time domain resource specifically includes one or more combinations of the number of symbols, a symbol location, the number of slots, a slot location, the number of mini-slots, a mini-slot location, the number of sub-frames and a sub-frame location.

In a case where the indication field is only used for indicating the time domain resource of the transmission corresponding to the downlink control channel, the time domain resource of the transmission corresponding to the downlink control channel is determined as the time domain resource indicated by the indication field. That is, in this case, the transmission is performed according to the location/number of the sub-frames or slots or mini-slots or symbols indicated by the indication field, regardless of the division of uplink resources and downlink resources in the time unit in which the transmission is located.

That is to say, in a case where the downlink control channel is used for scheduling an uplink shared channel transmission, the uplink shared channel performs the transmission within a time unit (which may include multiple time units) corresponding to the transmission, according to the location/number of sub-frames or slots or min-slots or symbols indicated by the indication field. In a case where the downlink control channel is used for scheduling a downlink shared channel transmission, the downlink shared channel performs the transmission within a time unit (which may include multiple time units) corresponding to the transmission, according to the location/number of sub-frames or slots or min-slots or symbols indicated by the indication field. In a case where the downlink shared channel scheduled by the downlink control channel or the downlink control channel itself needs to transmit ACK/NACK feedback information, the ACK/NACK feedback information is transmitted within a time unit (which may include multiple time units) corresponding to the transmission, according to the location/number of sub-frames or slots or min-slots or symbols indicated by the indication field.

Furthermore, in a case where the indication field is only used for indicating division of uplink resources and downlink resources in the target time unit in which the target transmission is located, the step 102 specifically includes: determining an uplink resource and/or a downlink resource in the target time unit in which the target transmission is located, according to the indication field; and taking all or part of the uplink resources or the downlink resources as the time domain resource of the target transmission; or taking all or part of resources pre-agreed or configured for data transmission in the uplink resources or the downlink resources, as the time domain resource of the target transmission.

When the downlink control channel is a downlink control channel that uses an uplink DCI format, then only the uplink resource in the target time unit is determined according to the indication information, or both the uplink resource and downlink resource in the target time unit are determined. When the downlink control channel is a downlink control channel that uses a downlink DCI format, and the target transmission is a downlink shared channel scheduled by the downlink control channel, then only the downlink resource in the target time unit is determined according to the indication information, or both the uplink resource and downlink resource in the target time unit are determined. When the downlink control channel is a downlink control channel that uses a downlink DCI format, and the target transmission is an ACK/NACK feedback corresponding to the downlink shared channel scheduled by the downlink control channel or an ACK/NACK feedback corresponding to the downlink control channel, then only the uplink resource in the target time unit is determined according to the indication information, or both the uplink resource and downlink resource in the target time unit are determined.

Herein, the division of the uplink resources and downlink resources specifically includes at least two of: the number of symbols occupied by the downlink resources in the time unit, the number of symbols occupied by the uplink resources in the time unit, and the number of symbols occupied by the GP in the time unit.

Alternatively, the division of the uplink resources and downlink resources specifically is a structure type of the time unit. The structure type includes one or more of the following structure types: a full-uplink structure type (that is, all symbols in the time unit are uplink), a full-downlink structure type (that is, all symbols in the time unit are downlink), and a structure type containing both uplink and downlink (that is, part of symbols in the time unit are uplink, part of symbols in the time unit are downlink, and the remaining symbols are GP). The structure type containing both the uplink and the downlink may further include an uplink-dominant structure type (that is, most of the symbols in the time unit are uplink) or a downlink-dominant structure type (that is, most of the symbols in the time unit are downlink).

For example, the time unit is indicated as one of the following structure types: full-uplink; full-downlink; and both uplink and downlink; wherein a plurality of structure types including both uplink and downlink may be pre-defined or configured, and each of the structure types corresponds to a different allocation ratio of uplink and downlink (that is, different numbers of uplink symbols and downlink symbols are contained), or the allocation ratio of uplink and downlink can be dynamically adjusted for the structure type including both uplink and downlink (for example, the GP size is dynamically determined according to neighboring interference, TA demand and the like so as to dynamically adjust the size of the uplink area and/or the downlink area.

For another example, the time unit is indicated as one of a plurality of pre-defined or configured structure types including both uplink and downlink; wherein each of the plurality of pre-defined or configured structure types including both uplink and downlink corresponds to a different allocation ratio of uplink and downlink (that is, different numbers of uplink symbols and downlink symbols are contained).

For still another example, the time unit is indicated as one of the following structure types: full-uplink; full-downlink; uplink-dominant; and downlink-dominant; wherein a plurality of uplink-dominant and/or downlink-dominant structure types may be pre-defined or configured, and each of the structure types corresponds to a different allocation ratio of uplink and downlink (that is, different numbers of uplink symbols and downlink symbols are contained).

In a case where the indication field only indicates division of uplink resources and downlink resources in the target time unit in which the transmission corresponding to the downlink control channel is located, the time domain resource of the transmission corresponding to the downlink control channel is determined as all or part of the resources in the corresponding resource area in the division of uplink resources and downlink resources indicated by the indication field.

That is, in a case where the downlink control channel is used to schedule an uplink shared channel transmission, the uplink shared channel performs transmission within a time unit (which may include multiple time units) corresponding to the transmission, on the entire uplink area determined according to the division of uplink resources and downlink resources indicated by the indication field, or on pre-agreed or configured part of the time domain resources. In a case where the downlink control channel is used to schedule a downlink shared channel transmission, the downlink shared channel performs transmission within a time unit (which may include multiple time units) corresponding to the transmission, on the entire downlink area determined for data transmission according to the division of uplink resources and downlink resources indicated by the indication field, or on pre-agreed or configured part of the time domain resources. In a case where the downlink shared channel scheduled by the downlink control channel or the downlink control channel itself needs to transmit ACK/NACK feedback information, the ACK/NACK feedback information is transmitted within a time unit (which may include multiple time units) corresponding to the transmission, on the entire uplink area determined according to the division of uplink resources and downlink resources indicated by the indication field, or on pre-agreed or configured part of the time domain resources.

Further, in a case where the indication field is used for indicating the time domain resource of the target transmission corresponding to the downlink control channel, and indicating division of uplink resources and downlink resources in the target time unit in which the target transmission is located, the above step 102 specifically includes: taking the time domain resource indicated by the indication field as the time domain resource of the target transmission corresponding to the downlink control channel; or determining an uplink resource and/or a downlink resource in the target time unit in which the target transmission is located, according to the indication field, and taking all or part of the uplink resources or the downlink resources as the time domain resource of the target transmission; or taking all or part of resources pre-agreed or configured for data transmission in the uplink resources or the downlink resources, as the time domain resource of the target transmission; or determining the time domain resource of the target transmission according to the time domain resource indicated by the indication field and the division of uplink resources and downlink resources in the target time unit.

Further, the step of determining the time domain resource of the target transmission according to the time domain resource indicated by the indication field and the division of uplink resources and downlink resources in the target time unit includes:

taking a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or taking a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or when the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then taking the time domain resource indicated by the indication field as the time domain resource of the target transmission; or when the time domain resource indicated by the indication field exceeds the size of the uplink resource or the downlink resource determined according to the indication field, then taking the uplink resource or the downlink resource as the time domain resource of the target transmission, or taking the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or when the time domain resource indicated by the indication field exceeds the size of an area pre-agreed or configured for data transmission in the uplink resource or the downlink resource determined according to the indication field, then taking the area pre-agreed or configured for data transmission in the uplink resource or the downlink resource as the time domain resource of the target transmission, or taking the time domain resource indicated by the indication field as the time domain resource of the target transmission, or taking a maximum value, a minimum value, an intersection set or a union set of the area pre-agreed or configured for data transmission in the uplink resource or the downlink resource and the time domain resource indicated by the indication field as the time domain resource of the target transmission.

In a specific embodiment of the present disclosure, if the indication field indicates both the time domain resource of the transmission corresponding to the downlink control channel, and the division of uplink resources and downlink resources in the time unit in which the transmission corresponding to the downlink control channel is located, the time domain resource is determined according to only one of the indication contents or according to both the two indication contents.

For example, the time domain resource indicated by the indication field is determined as the time domain resource of the transmission corresponding to the downlink control channel, of which the details are the same as the above.

Alternatively, all or part of the resources in a corresponding resource area in the division of uplink resources and downlink resources indicated by the indication field is determined as the time domain resource of the transmission corresponding to the downlink control channel, of which the details are the same as the above.

Alternatively, a maximum value or a minimum value of the time domain resource indicated by the indication field and the time domain resource in the corresponding resource area in the division of uplink resources and downlink resources indicated by the indication field is determined as the time domain resource of the transmission corresponding to the downlink control channel.

That is, in a case where the downlink control channel is used to schedule an uplink shared channel transmission, the uplink shared channel performs transmission within a time unit (which may include multiple time units) corresponding to the transmission, according to a maximum value, or a minimum value, or a union set or an intersection set of a specific time domain resource indicated by the indication field and a time domain resource in an uplink area determined according to the division of uplink resources and downlink resources indicated by the indication field. In a case where the downlink control channel is used to schedule a downlink shared channel transmission, the downlink shared channel performs transmission within a time unit (which may include multiple time units) corresponding to the transmission, according to a maximum value, or a minimum value, or a union set or an intersection set of a specific time domain resource indicated by the indication field and a time domain resource for data transmission in a downlink area determined according to the division of uplink resources and downlink resources indicated by the indication field. In a case where the downlink shared channel scheduled by the downlink control channel or the downlink control channel itself needs to transmit ACK/NACK feedback information, the ACK/NACK feedback information is transmitted within a time unit (which may include multiple time units) corresponding to its transmission, according to a maximum value, or a minimum value, or a union set or an intersection set of a specific time domain resource indicated by the indication field and all the time domain resources or pre-agreed part of time domain resources in an uplink area determined according to the division of uplink resources and downlink resources indicated by the indication field.

In step 103, data is transmitted on the time domain resource.

Specifically, in a case where the downlink control channel is a downlink control channel using the uplink DCI format, the terminal transmits an uplink shared channel scheduled by the downlink control channel on the time domain resource.

In a case where the downlink control channel is a downlink control channel using the downlink DCI format, the terminal transmits a downlink shared channel scheduled by the downlink control channel, on the time domain resource. Alternatively, in a case where the downlink control channel is a downlink control channel using the downlink DCI format, the terminal transmits ACK/NACK feedback information corresponding to a downlink shared channel scheduled by the downlink control channel or ACK/NACK feedback information corresponding to the downlink control channel, on the time domain resource.

In addition, in the above process, the terminal may also detect indication information in each time unit or a specific time unit (such as, a time unit that is pre-configured or pre-agreed for sending indication information). The indication information is used for indicating the division of uplink resources and downlink resources in one or more time units.

When the division of uplink resources and downlink resources indicated by the indication information detected by the terminal is inconsistent with an indication content of the indication field in the downlink control channel, the indication content of the indication field in the downlink control channel is adopted.

When the indication field in the downlink control channel indicates the time domain resource, in a case where the time domain resource starts from a first symbol of one time unit, it is determined that the time unit is a full-uplink, or in a case where the time domain resource spans two time units, it is determined that the second time unit is full-uplink.

In the target time unit, the terminal may not detect the indication information indicating the division of uplink resources and downlink resources in the time unit, thereby achieving power saving, in a case where it is determined by the terminal according to the indication field that the target time unit is a full-uplink (for example, the time domain resource fully occupies one time unit, or the target time unit is determined to be a full-uplink according to the division of uplink resources and downlink resources).

It should be noted that if an indication field that can indicate a time domain resource of the uplink shared channel exists in the downlink control channel, the time domain resource indicated by the indication field in the downlink control channel may be less than, equal to or greater than the size of an uplink area determined according to the indication information. When the time domain source is greater than the size of the uplink area determined according to the indication information, a transmission may be performed always according to the size of the uplink area, or always according to the time domain source indicated by the indication field in the downlink control channel, or a maximum value or a minimum value of the size of the uplink area and the time domain source indicated by the indication field in the downlink control channel is used.

With the data transmission method of the embodiment of the present disclosure, the object of realizing transmission in a variable slot structure is achieved by: receiving a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

Second Embodiment

Figure 2:
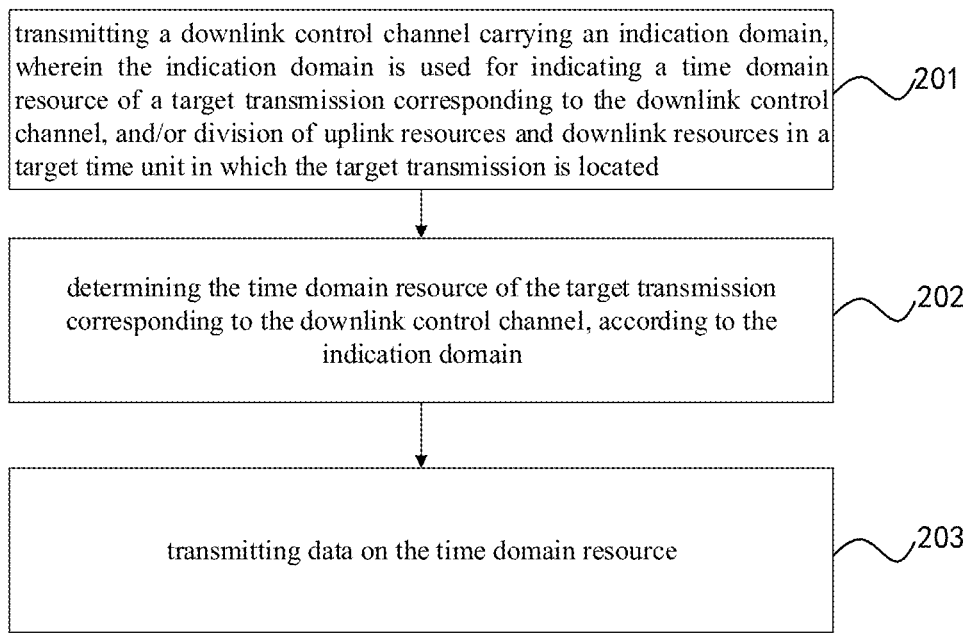
FIG. 2 is a second workflow diagram of a data transmission method according to an embodiment of the present disclosure.

As shown in FIG. 2, a data transmission method is further provided according to an embodiment of the present disclosure, which is applied to a base station. The base station includes steps 201 and 203.

In step 201, a downlink control channel carrying an indication field is transmitted, wherein the indication field is used for indicating a time domain resource of a target transmission corresponding to the downlink control channel, and/or indicating division of uplink resources and downlink resources in a target time unit in which the target transmission is located.

In this step, the downlink control channel is a downlink control channel using an uplink DCI format (i.e., a downlink control channel carrying an uplink scheduling grant, that is, an uplink scheduling instruction (UL grant)) and/or a downlink control channel using a downlink DCI format (i.e., a downlink control channel carrying a downlink scheduling grant, that is, a downlink scheduling instruction (DL grant), including a downlink control channel indicating a release of a short downlink semi-persistent scheduling (SPS) resource).

In step 202, the time domain resource of the target transmission corresponding to the downlink control channel is determined according to the indication field.

This step is the same as the above step 102, and is not described repeatedly herein.

In step 203, data is transmitted on the time domain resource.

This step is the same as the above step 103, and is not described repeatedly herein. For uplink shared channel, the activity of the base station is receiving; for downlink shared channel, the activity of the base station is transmitting; and for ACK/NACK feedback information, the activity of the base station is receiving.

With the data transmission method of the embodiment of the present disclosure, the object of realizing transmission in a variable slot structure is achieved by: transmitting a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

Third Embodiment

This embodiment is a specific application example of a data transmission method according to the present disclosure.

In some embodiments of the present disclosure, an example is used in which one slot is one time unit. It is assumed that one slot contains 7 symbols (Orthogonal Frequency Division Multiplexing (OFDM) or Single Carrier Frequency Division Multiple Access (SC-FDMA) symbols); of course, definitions of a time unit of other lengths are not excluded.

A specific implementation process of the data transmission method of the embodiment of the present disclosure is as follows.

It is assumed that the UL grant sent in the downlink area in the current time unit can schedule PUSCH transmission in the uplink area of the current time unit (that is, the uplink processing delay of the terminal is sufficient; of course, the scheduling relationship may not be pre-agreed, and may be notified in the UL grant, for example, directly notifying transmission of the PUSCH in the current or next time unit, or in the subsequent several time units). The UL grant includes an indication field for indicating a time domain resource of the scheduled PUSCH.

Base Station Side

Figure 3:
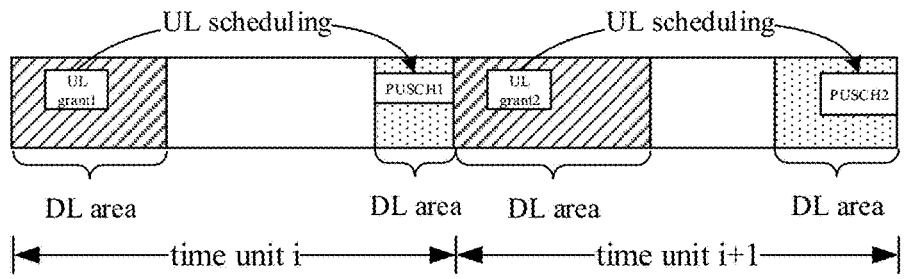
FIG. 3 is a first schematic transmission diagram of a data transmission method according to an embodiment of the present disclosure.

As shown in FIG. 3, the base station sends a UL grant in one time unit for scheduling a corresponding terminal to transmit a PUSCH on a time domain resource indicated by an indication field of the UL grant in the time unit. For example, a UL grant1 is sent in a time unit i, and an indication field of UL grant1 indicates that PUSCH1 is transmitted on the sixth and seventh symbols (i.e., both a symbol location and a symbol length are notified), or indicates that PUSCH1 is transmitted on two symbols (in this case, two symbols in front of an end position of the time unit is default, i.e., the last two symbols in the time unit; hence, only the symbol length is notified and no symbol location needs to be notified). Of course, there may be other indication manners, for example, the numbering/the number of the slots, the numbering/the number of mini-slots, etc. Further, it may also indicate whether to transmit across adjacent slots, and the like. Of course, the size of the time domain resource indicated by the UL grant may also be less than a pre-configured or pre-defined size of the uplink area in this time unit, as shown by PUSCH2 scheduled by UL grant2 in time unit i+1.

It should be noted that, the base station may divide a downlink area and an uplink area for a time unit in advance according to priori information such as scheduling requirements. The time domain resource of the PUSCH indicated by the indication field in the UL grant sent by the base station needs to be included in the uplink area. Of course, the base station may flexibly indicate in the UL grant which time domain location the PUSCH will be transmitted at, according to actual scheduling requirements, instead of dividing the downlink area and the uplink area in advance, thereby flexibly adjusting the size of the uplink area.

The PUSCH sent by the terminal is received on the time domain resource indicated by the indication field in the above UL grant, according to scheduling information (such as frequency domain resources and MCS) in the UL grant.

Terminal Side

The terminal detects the UL grant in each time unit, and determines a time domain resource of the scheduled PUSCH according to an indication field in the UL grant (the specific manner is the same as above) after receiving the UL grant, then transmits the PUSCH on the corresponding time domain resource in the time unit according to the scheduling information (such as frequency domain resource and the MCS levels) in the UL grant.

Fourth Embodiment

This embodiment is another specific application example of a data transmission method according to the present disclosure.

In some embodiments of the present disclosure, an example is used in which one slot is one time unit. It is assumed that one slot contains 7 symbols (Orthogonal Frequency Division Multiplexing (OFDM) or Single Carrier Frequency Division Multiple Access (SC-FDMA) symbols); of course, definitions of a time unit of other lengths are not excluded.

A specific implementation process of the data transmission method of the embodiment of the present disclosure is as follows.

It is assumed that a UL grant sent in a downlink area in a current time unit can schedule PUSCH transmission in an uplink area in a next time unit (of course, the scheduling relationship may not be pre-agreed, and may be notified in the UL grant; for example, directly notifying transmission of the PUSCH in the current or next time unit, or in the subsequent several time units). The UL grant includes an indication field for indicating a time domain resource of the scheduled PUSCH.

Base Station Side

Figure 4:
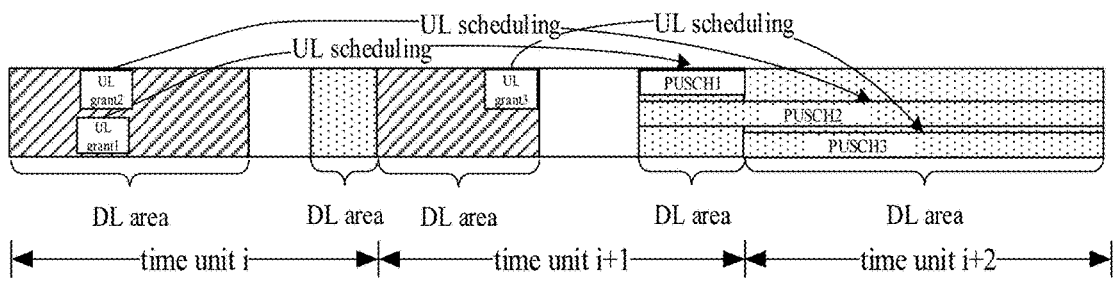
FIG. 4 is a second schematic transmission diagram of a data transmission method according to an embodiment of the present disclosure.

As shown in FIG. 4, the base station sends a UL grant in one time unit for scheduling a corresponding terminal to transmit a PUSCH on a time domain resource indicated by an indication field of a UL grant corresponding to a next time unit or several time units starting from the next time unit. For example, a UL grant1 is sent in a time unit i, and an indication field of UL grant1 indicates that PUSCH1 is transmitted on the sixth and seventh symbols in the next time unit (i.e., both a symbol location and a symbol length are notified), or indicates that PUSCH1 is transmitted on two symbols (in this case, two symbols in front of an end position of the time unit is default, i.e., the last two symbols in the time unit; hence, only the symbol length is notified and no symbol location needs to be notified). Of course, there may be other indication manners, for example, the numbering/the number of the slots, the numbering/the number of mini-slots, etc. Further, it may also indicate whether to transmit across adjacent slots, and the like. The base station may further send a UL grant2 in a time unit i, and schedule a transmission of a PUSCH2 on continuous 9 symbols from the sixth symbol in a time unit i+1. In this case, the terminal may directly determine that a time unit i+2 is full-uplink. An indication field in the UL grant2 can directly indicate that if the PUSCH2 starts from the sixth symbol in the time unit i+1 and has a length of 9 symbols, then the PUSCH2 is transmitted across the time unit i+1 and the time unit i+2. The indication field in the UL grant2 may only notify to transmit the PUSCH2 across two time units, and the PUSCH2 is transmitted by default by occupying all uplink symbols in time unit i+1 and time unit i+2. The base station may further send a UL grant3 in a time unit i+1, and schedules a transmission of a PUSCH3 from the first symbol in the time unit i+2. In this case, the terminal can directly judge that the time unit i+2 is full-uplink, an indication field in the UL grant3 can directly notify that the PUSCH3 starts from the first symbol in the time unit i+2, and the transmission occupies one time unit by default. The indication field in UL grant3 may also notify that the PUSCH3 is transmitted by occupying 7 symbols, and the transmission occupies one time unit by default, that is, the transmission starts from the first symbol and ends at the last symbol. Of course, the PUSCH1 may also be scheduled to be transmitted by occupying part of the symbols in the uplink area in the time unit i+1 (e.g., occupying only the last symbol), the PUSCH2 may also be scheduled to be transmitted by occupying part of the symbols in the uplink area in the time unit i+1 (e.g., starting from the last symbol in the time unit) and/or occupying part of the symbols in the time unit i+2, and PUSCH3 may also be scheduled to be transmitted by occupying only part of the symbols in the time unit i+2.

It should be noted that, the base station may divide a downlink area and an uplink area for a time unit in advance according to priori information such as scheduling requirements. The time domain resource of the PUSCH indicated by the indication field in the UL grant sent by the base station needs to be included in the uplink area. Of course, the base station may flexibly indicate in the UL grant which time domain location the PUSCH will be transmitted at, according to actual scheduling requirements, instead of dividing the downlink area and the uplink area in advance, thereby flexibly adjusting the size of the uplink area.

The PUSCH sent by the terminal is received on the time domain resource indicated by the indication field in the above UL grant, according to scheduling information (such as frequency domain resources and MCS) in the UL grant.

Terminal Side

As shown in FIG. 4, the terminal detects the UL grant in each time unit, and determines a time domain resource of the scheduled PUSCH according to an indication field in the UL grant (the specific manner is the same as above) after receiving the UL grant, then transmits the PUSCH on the corresponding time domain resource in the time unit according to the scheduling information (such as frequency domain resource and the MCS levels) in the UL grant.

Fifth Embodiment

This embodiment is further another specific application example of a data transmission method according to the present disclosure.

In the embodiment of the present disclosure, an example is used in which one slot is one time unit. It is assumed that one slot contains 7 symbols (Orthogonal Frequency Division Multiplexing (OFDM) or Single Carrier Frequency Division Multiple Access (SC-FDMA) symbols); of course, definitions of a time unit of other lengths are not excluded.

A specific implementation process of the data transmission method of the embodiment of the present disclosure is as follows.

It is assumed that a UL grant sent in a downlink area in a current time unit can schedule PUSCH transmission in an uplink area in the current time unit or a next time unit (different scheduling relationships may be maintained by different terminals, of course, the scheduling relationship may not be pre-agreed, and may be notified in the UL grant; for example, directly notifying transmission of the PUSCH in the current or next time unit, or in the subsequent several time units). The UL grant includes an indication field for indicating the division of uplink resources and downlink resources in a time unit in which the scheduled PUSCH transmission is located.

Base Station Side

Figure 5:
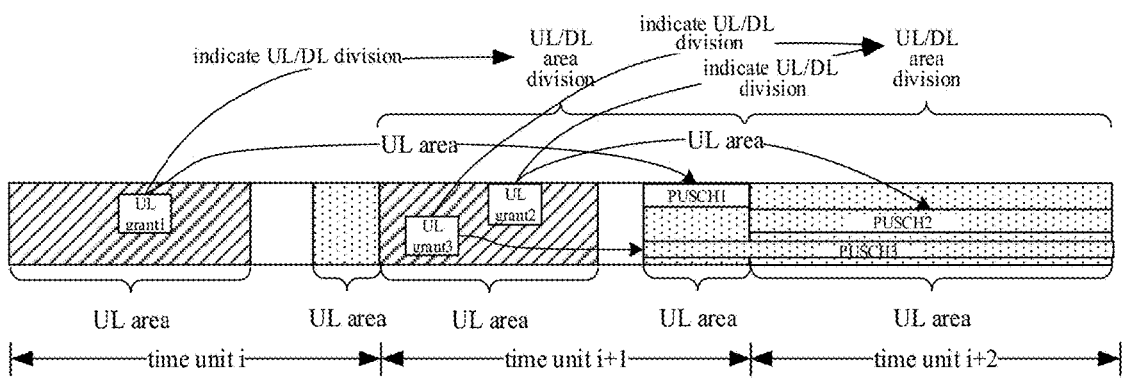
FIG. 5 is a third schematic transmission diagram of a data transmission method according to an embodiment of the present disclosure.

As shown in FIG. 5, the base station sends a UL grant in one time unit for scheduling a corresponding terminal to transmit a PUSCH in a next time unit or several time units starting from the next time unit. A time domain resource of the PUSCH transmission is determined according to the division of uplink resources and downlink resources in the time unit indicated by the indication field in the UL grant. For example, a UL grant1 is sent in a time unit i, for scheduling a terminal to transmit a PUSCH1 in a time unit i+1, of which an indication field indicates the division of uplink resources and downlink resources in a next time unit i+1. The an indication field may directly indicate at least two types of information of the number of symbols in a downlink area, the number of symbols in an uplink area and the number of GB symbols, and may also indicate a structure type of a predetermined time unit, such as a predetermined full uplink structure, a structure of 4 downlink symbols+2 uplink symbols (1 symbol GP), and a structure of 2 downlink symbols+4 uplink symbols (1 symbol GP). In this case, the division of uplink resources and downlink resources of the time unit i+1 is determined as 6 downlink symbols+2 uplink symbols, according to indication information of the indication field. Hence, by default, the PUSCH1 scheduled by the UL grant1 is transmitted by occupying all symbols in the uplink area in the time unit i+1, i.e., occupying the sixth and seventh symbols (the last two symbols) in the time unit i+1. The base station may send a UL grant2 in time unit i+1, for scheduling the terminal to transmit PUSCH2 in a time unit i+2, of which an indication field indicates the division of uplink resources and downlink resources in the next time unit i+2. The time unit i+2 is determined as full-uplink according to the indication field in the UL grant2 by using the indication manner similar to that in the UL grant1, so it is determined by default that the PUSCH2 scheduled by the UL grant2 is transmitted on all symbols in the time unit i+2.

Further, different scheduling relationships can be maintained by different terminals. For example, there is a type of terminals which perform scheduling across time units according to the manners of UL grant1 and UL grant2. There may also be a type of terminals that can perform a scheduling within one time unit according to the manner of UL grant3. That is, the base station may also send the UL grant3 in the time unit i+1, to schedule the uplink area in the time unit i+1 to start a transmission of PUSCH3. The time unit i+2 is determined to be full-uplink according to the indication field in the UL grant3 in an indication manner similar to that in the UL grant1. In an implementation, the terminal always considers that the PUSCH3 scheduled by the UL grant3 is only transmitted in the uplink area in the time unit i+1; for example, if the uplink area includes 2 symbols, the PUSCH3 is always transmitted on the last 2 symbols in the time unit i+1. In another implementation, since the terminal can determine that the time unit i+2 is full-uplink according to the indication field in the UL grant3, the PUSCH3 scheduled by the UL grant3 may be transmitted by default on all of symbols in the time unit i+1 and the time unit i+2. In another implementation, the indication field in the UL grant3 may further indicate whether the PUSCH3 is transmitted across different time units or indicate the specific location/number of a symbol of the PUSCH3 transmission (similar to the time domain resource indication in the embodiment 1/2). Then, the terminal may determine, according to the indication information, whether the PUSCH3 is only transmitted on two symbols in the time unit i+1, or is transmitted by occupying nine symbols across the time unit i+1 and time unit i+2.

Of course, if the indication field in each UL grant further includes information indicating a time domain resource of the PUSCH (such as the indication information in the embodiment 1/2), the numbers of symbols occupied by the PUSCH1, PUSCH2, and PUSCH3 may be less than the number of symbols in the uplink area, that is, not all of the symbols contained in the uplink area in one time unit are occupied.

The PUSCH sent by the terminal is received on the above time domain resource determined according to the indication field in the above UL grant, according to scheduling information (such as frequency domain resources and MCS) in the UL grant.

Terminal Side

As shown in FIG. 5, the UL grant is detected in each time unit, and a time domain resource of a scheduled PUSCH is determined according to an indication field in the UL grant (the specific manner is the same as above) after the UL grant is received. Then, the PUSCH is transmitted on the corresponding time domain resource in the time unit according to the scheduling information in the UL grant (such as frequency domain resource and the MCS levels).

It should be noted that, other scheduling relationships (i.e., a correspondence between the UL grants and the time units in which the PUSCH transmission is located) or an indication relationship of the indication field (i.e., a correspondence between the indication fields and the division of uplink resources and downlink resources in the indicated time units) are also included in the present disclosure. In addition, the scheduling relationship and the indication relationship of the indication fields may also correspond to multiple time units. Various manners of the scheduling relationship and various indication relationships of the indication information may be combined with each other.

In the foregoing embodiments, the scheduling relationship of the UL grants and the indication relationship of the indication field included in the UL grant are only used as an example. In a case where the UL grant and the PUSCH are replaced with a DL grant and a PDSCH, or replaced with a DL grant and a corresponding ACK/NACK feedback, an operational mode is similar and is not described repeatedly herein.

Sixth Embodiment

Figure 6:
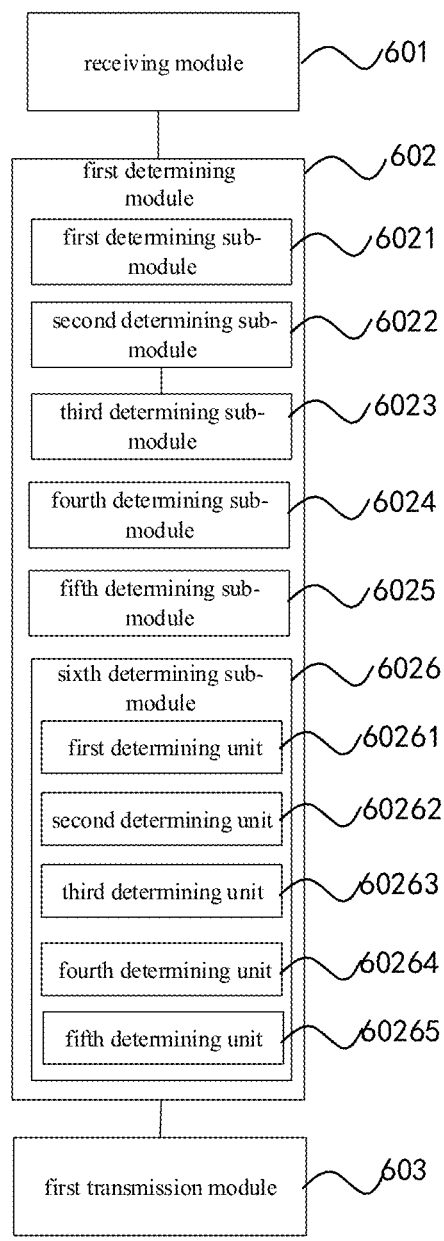
FIG. 6 is a first structural block diagram of a terminal according to an embodiment of the present disclosure.

As shown in FIG. 6, a terminal is further provided according to an embodiment of the present disclosure. The terminal includes:

a receiving module 601, configured to receive a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a first determining module 602, configured to determine the time domain resource of the target transmission corresponding to the downlink control channel, according to the indication field; and a first transmission module 603, configured to transmit data on the time domain resource.

In the terminal according to the embodiment of the present disclosure, in a case where the indication field is only used for indicating the time domain resource of the target transmission corresponding to the downlink control channel, the first determining module 602 includes:

a first determining sub-module 6021, configured to take the time domain resource indicated by the indication field as the time domain resource of the target transmission corresponding to the downlink control channel.

In the terminal according to the embodiment of the present disclosure, the indication field is only used for indicating division of uplink resources and downlink resources in the target time unit in which the target transmission is located;

the first determining module 602 includes:

a second determining sub-module 6022, configured to determine an uplink resource and/or a downlink resource in the target time unit in which the target transmission is located, according to the indication field; and a third determining sub-module 6023, configured to take all or part of the uplink resources or the downlink resources as the time domain resource of the target transmission; or take all or part of resources pre-agreed or configured for data transmission in the uplink resources or the downlink resources, as the time domain resource of the target transmission.

In the terminal according to the embodiment of the present disclosure, the indication field is used for indicating the time domain resource of the target transmission corresponding to the downlink control channel, and indicating division of uplink resources and downlink resources in the target time unit in which the target transmission is located;

the first determining module 602 includes:

a fourth determining sub-module 6024, configured to take the time domain resource indicated by the indication field as the time domain resource of the target transmission corresponding to the downlink control channel; or a fifth determining sub-module 6025, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or configured for data transmission in the uplink resources or the downlink resources, as the time domain resource of the target transmission; or a sixth determining sub-module 6026, configured to determine the time domain resource of the target transmission according to the time domain resource indicated by the indication field and the division of uplink resources and downlink resources in the target time unit.

In the terminal according to the embodiment of the present disclosure, the sixth determining sub-module 6026 includes:

a first determining unit 60261, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or, a second determining unit 60262, configured to take a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or a third determining unit 60263 configured to: if the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then take the time domain resource indicated by the indication field as the time domain resource of the target transmission; or a fourth determining unit 60264 configured to: if the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or a fifth determining unit 60265 configured to: if the time domain resource indicated by the indication field exceeds the size of an area pre-agreed or configured for data transmission in the uplink resource or the downlink resource determined according to the indication field, then take the area pre-agreed or configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or configured for data transmission in the uplink resource or the downlink resource and the time domain resource indicated by the indication field as the time domain resource of the target transmission.

In the terminal according to the embodiment of the present disclosure, the target transmission corresponding to the downlink control channel specifically includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

In the terminal according to the embodiment of the present disclosure, the target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

In the terminal according to the embodiment of the present disclosure, the time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

In the terminal according to the embodiment of the present disclosure, the division of uplink resources and downlink resources in the target time unit in which the target transmission is located indicated by the indication field includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

In the terminal according to the embodiment of the present disclosure, the structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

In the terminal according to the embodiment of the present disclosure, the target time unit is a pre-defined or pre-configured unit including D1 sub-frames, D2 slots, D3 mini-slots or D4 symbols, wherein D1, D2, D3 and D4 are integers greater than or equal to 1.

The terminal according to the embodiment of the present disclosure determines the time domain resource of the corresponding transmission according to the indication information in a scheduling signaling so as to perform a correct transmission.

Seventh Embodiment

Figure 7:
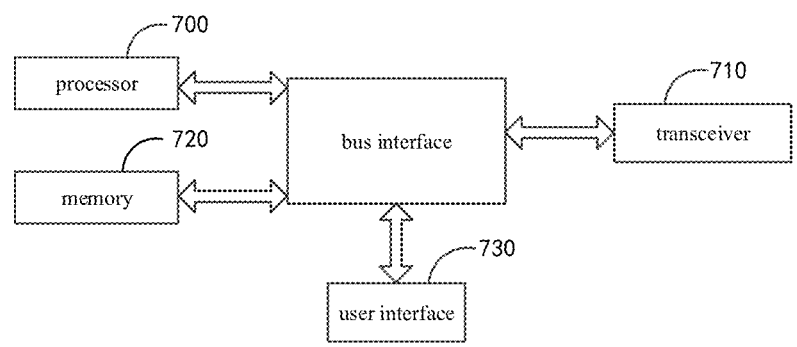
FIG. 7 is a second structural block diagram of a terminal according to an embodiment of the present disclosure.

In order to better achieve the above object, as shown in FIG. 7, a fifth embodiment of the present disclosure further provide a terminal, which includes: a processor 700; a memory 720 connected to the processor 700 through a bus interface; and a transceiver 710 connected to the processor 700 through the bus interface; wherein the memory is configured to store programs and data used by the processor to execute operations; the transceiver 710 receives a downlink control channel; when the processor 700 calls and executes programs and data stored in the memory 720, the following functional modules are implemented:

a receiving module, configured to receive a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a first determining module, configured to determine the time domain resource of the target transmission corresponding to the downlink control channel, according to the indication field; and a first transmission module, configured to transmit data on the time domain resource.

The processor 700 is configured to read programs in the memory 720 and execute the following operations: the transceiver 710 receiving a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource.

The transceiver 710 is configured to receive and transmit data under the control of the processor 700.

In FIG. 7, the bus architecture may include any number of interconnected buses and bridges, which are specifically linked together by various circuits of one or more processors represented by the processor 700 and memories represented by the memory 720. The bus architecture may also link various other circuits together, such as peripherals, voltage regulators, and power management circuits, which are well known in the art and therefore are not further described herein. The bus interface provides an interface. The transceiver 710 may include a plurality of components, including a transmitter and a transceiver, and provide units for communicating with various other devices on a transmission medium. For different user equipment, the user interface 730 may also be an interface capable of externally/internally connecting with the required devices, the connected devices including but not limited to a keypad, a display, a speaker, a microphone, and a joystick.

The processor 700 is responsible for managing the bus architecture and the general processing, and the memory 720 can store data used by the processor 700 in performing operations.

In the terminal according to the embodiment of the present disclosure, the object of realizing transmission in a variable slot structure is achieved by: receiving, by the processor 700 via the transceiver 710, a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

Eighth Embodiment

Figure 8:
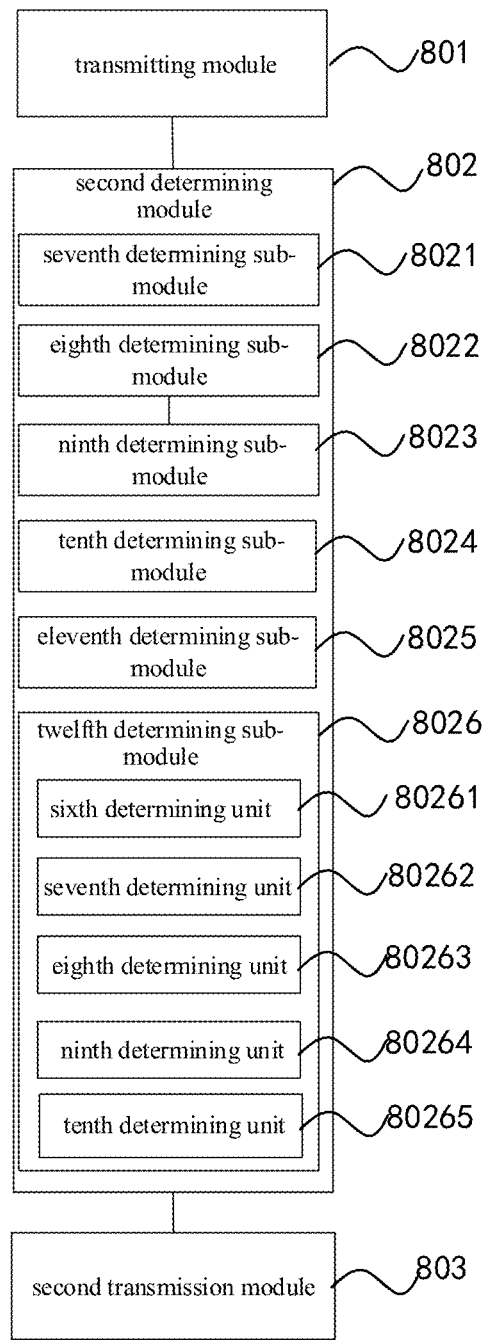
FIG. 8 is a first structural block diagram of a base station according to an embodiment of the present disclosure.

As shown in FIG. 8, a base station is further provided according to an embodiment of the present disclosure. The base station includes:

a transmitting module 801, configured to transmit a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a second determining module 802, configured to determine the time domain resource of the target transmission corresponding to the downlink control channel, according to the indication field; and a second transmission module 803, configured to transmit data on the time domain resource.

In the base station according to the embodiment of the present disclosure, the indication field is only used for indicating the time domain resource of the target transmission corresponding to the downlink control channel;

the second determining module 802 includes:

a seventh determining sub-module 8021, configured to take the time domain resource indicated by the indication field as the time domain resource of the target transmission corresponding to the downlink control channel In the base station according to the embodiment of the present disclosure, the indication field is only used for indicating division of uplink resources and downlink resources in the target time unit in which the target transmission is located;

the second determining module 802 includes:

an eighth determining sub-module 8022, configured to determine an uplink resource and/or a downlink resource in the target time unit in which the target transmission is located, according to the indication field; and a ninth determining sub-module 8023, configured to take all or part of the uplink resources or the downlink resources as the time domain resource of the target transmission; or take all or part of resources pre-agreed or configured for data transmission in the uplink resources or the downlink resources, as the time domain resource of the target transmission.

In the base station according to the embodiment of the present disclosure, the indication field is used for indicating the time domain resource of the target transmission corresponding to the downlink control channel, and indicating division of uplink resources and downlink resources in the target time unit in which the target transmission is located;

the second determining module 802 includes:

a tenth determining sub-module 8024, configured to take the time domain resource indicated by the indication field as the time domain resource of the target transmission corresponding to the downlink control channel; or an eleventh determining sub-module 8025, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or configured for data transmission in the uplink resources or the downlink resources, as the time domain resource of the target transmission; or a twelfth determining sub-module 8026, configured to determine the time domain resource of the target transmission according to the time domain resource indicated by the indication field and the division of uplink resources and downlink resources in the target time unit.

In the base station according to the embodiment of the present disclosure, the twelfth determining sub-module 8026 includes:

a sixth determining unit 80261, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or a seventh determining unit 80262, configured to take a maximum value, a minimum value, an intersection set, or a union set of: i) all or part of time domain resources pre-agreed or configured for data transmission in the uplink resources or the downlink resources, and ii) the time domain resource indicated by the indication field, as the time domain resource of the target transmission; or, an eighth determining unit 80263 configured to: if the time domain resource indicated by the indication field does not exceed the size of the uplink resource or the downlink resource determined according to the indication field, or does not exceed the size of an area pre-agreed or configured for data transmission in the uplink resource or the downlink resource determined according to the indication field, then take the time domain resource indicated by the indication field as the time domain resource of the target transmission; or a ninth determining unit 80264 configured to: if the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or a tenth determining unit 80265 configured to: if the time domain resource indicated by the indication field exceeds the size of an area pre-agreed or configured for data transmission in the uplink resource or the downlink resource determined according to the indication field, then take the area pre-agreed or configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or configured for data transmission in the uplink resource or the downlink resource and the time domain resource indicated by the indication field as the time domain resource of the target transmission.

In the base station according to the embodiment of the present disclosure, the target transmission corresponding to the downlink control channel specifically includes:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format.

In the base station according to the embodiment of the present disclosure, the target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel.

In the base station according to the embodiment of the present disclosure, the time domain resource indicated by the indication field includes one or more types of the following information:

the number of symbols, a symbol location, the number of mini-slots, a mini-slot location, the number of slots, a slot location, the number of sub-frames, and a sub-frame location.

The mini-slot is a unit occupying X symbols, and X is an integer greater than or equal to 1.

In the base station according to the embodiment of the present disclosure, the division of uplink resources and downlink resources in the target time unit in which the target transmission is located indicated by the indication field specifically includes:

resource information of the downlink resource in the target time unit in which the target transmission is located; or resource information of the uplink resource in the target time unit in which the target transmission is located; or at least two of: resource information of the downlink resource in the target time unit in which the target transmission is located, resource information of the uplink resource in the target time unit in which the target transmission is located, and resource information of a guard interval GP, wherein the resource information includes the size and/or location of the resource; or a structure type of a target time unit corresponding to the downlink control channel.

In the base station according to the embodiment of the present disclosure, the structure type includes at least one of the following structure types:

a first structure type in which symbols or mini-slots, or slots or sub-frames in the target time unit are all used for uplink transmission; a second structure type in which symbols or mini-slots, or slots or sub-frames in the target time unit are all used for downlink transmission; and a third structure type in which first partial symbols or first partial mini-slots, or first partial slots or first partial sub-frames in the target time unit are used for uplink transmission, while second partial symbols or second partial mini-slots, or second partial slots or second partial sub-frames in the target time unit are used for downlink transmission.

In the base station according to the embodiment of the present disclosure, the target time unit is a pre-defined or pre-configured unit including D1 sub-frames, D2 slots, D3 mini-slots or D4 symbols, wherein D1, D2, D3 and D4 are integers greater than or equal to 1.

In the base station according to the embodiment of the present disclosure, the object of realizing transmission in a variable slot structure is achieved by: transmitting a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

Ninth Embodiment

Figure 9:
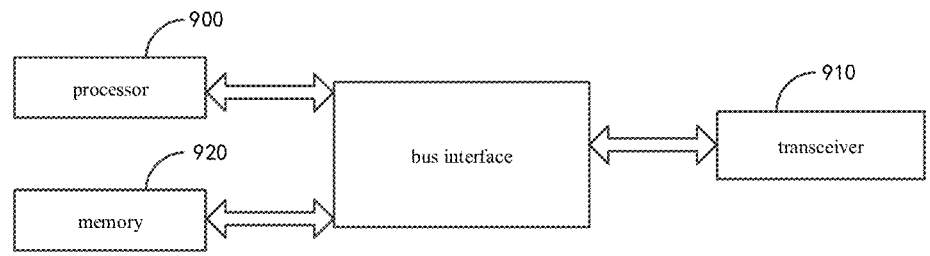
FIG. 9 is a second structural block diagram of a base station according to an embodiment of the present disclosure.

In order to better achieve the above object, as shown in FIG. 9, a seventh embodiment of the present disclosure further provide a base station, which includes: a processor 900; a memory 920 connected to the processor 900 through a bus interface; and a transceiver 910 connected to the processor 900 through the bus interface; wherein the memory 920 is configured to store programs and data used by the processor in performing operations; the transceiver 910 sends data information or pilot frequency, and receives uplink control channel; when the processor 900 calls and executes programs and data stored in the memory 920, the following functional modules are implemented:

a transmitting module, configured to transmit a downlink control channel carrying an indication field, wherein the indication field is used for indicating a time domain resource of a target transmission corresponding to the downlink control channel, and/or indicating division of uplink resources and downlink resources in a target time unit in which the target transmission is located;

a second determining module, configured to determine the time domain resource of the target transmission corresponding to the downlink control channel, according to the indication field; and a second transmission module, configured to transmit data on the time domain resource.

The processor 900 is configured to read programs in the memory 920 and execute the following operations: the transceiver 910 transmitting a downlink control channel, and indication information for indicating division of uplink resources and downlink resources in a time unit; determining uplink resources and/or downlink resources in a target time unit corresponding to the downlink control channel, according to the indication information, wherein the target time unit is the time unit in which a target transmission corresponding to the downlink control channel is located; and determining time domain resources of the target transmission corresponding to the downlink control channel in the uplink resources or the downlink resources, and performing the target transmission in the time domain resources The transceiver 910 is configured to receive and transmit data under the control of the processor 900.

In FIG. 9, the bus architecture may include any number of interconnected buses and bridges, which are specifically linked together by various circuits of one or more processors represented by the processor 700 and memories represented by the memory 720. The bus architecture may also link various other circuits together, such as peripherals, voltage regulators, and power management circuits, which are well known in the art and therefore are not further described herein. The bus interface provides an interface. The transceiver 910 may include a plurality of components, including a transmitter and a transceiver, and provide units for communicating with various other devices on a transmission medium. The processor 900 is responsible for managing the bus architecture and the general processing, and the memory 920 can store data used by the processor 900 in performing operations.

In the base station according to the embodiment of the present disclosure, the object of realizing transmission in a variable slot structure is achieved by: transmitting, by the processor 900 via the transceiver 910, a downlink control channel carrying an indication field, wherein the indication field is used for indicating a time domain resource of a target transmission corresponding to the downlink control channel, and/or indicating division of uplink resources and downlink resources in a target time unit in which the target transmission is located; determining the time domain resource of the target transmission corresponding to the downlink control channel, according to the indication field; and transmitting data on the time domain resource. As such, the problem of realizing transmission in a variable slot structure which is not addressed in the related art is solved.

The above described are only preferred embodiments of the present disclosure, which are not intended to limit the present disclosure, and any modifications, equivalent substitutes, improvements, etc., made within the spirit and principles of the present disclosure should be included within the scope of protection of the present disclosure.

What is claimed is:

1. A data transmission method which is applied to a terminal, the method comprising:

receiving a downlink control channel carrying an indication field, wherein the indication field is used for indicating a time domain resource of a target transmission corresponding to the downlink control channel, and indicating division of uplink resources and downlink resources in a target time unit in which the target transmission is located, or, the indication field is used for indicating division of uplink resources and downlink resources in a target time unit in which a target transmission corresponding to the downlink control channel is located; wherein the target time unit is one slot;

determining the time domain resource of the target transmission corresponding to the downlink control channel, according to the indication field; and transmitting data on the time domain resource;

wherein the division of uplink resources and downlink resources in the target time unit in which the target transmission is located indicated by the indication field comprises:

at least two of: resource information of the downlink resource in the target time unit in which the target transmission is located, resource information of the uplink resource in the target time unit in which the target transmission is located, and resource information of a guard period (GP), wherein the resource information comprises the size and/or location of the resource.

2. The data transmission method according to claim 1, wherein the indication field is only used for indicating division of uplink resources and downlink resources in the target time unit in which the target transmission is located; the step of determining the time domain resource of the target transmission corresponding to the downlink control channel according to the indication field comprises:

determining an uplink resource and/or a downlink resource in the target time unit in which the target transmission is located, according to the indication field; and taking all or part of the uplink resources or the downlink resources as the time domain resource of the target transmission; or taking all or part of resources pre-agreed or pre-configured for data transmission in the uplink resources or the downlink resources, as the time domain resource of the target transmission; or, wherein the indication field is used for indicating the time domain resource of the target transmission corresponding to the downlink control channel, and indicating division of uplink resources and downlink resources in the target time unit in which the target transmission is located;

the step of determining the time domain resource of the target transmission corresponding to the downlink control channel according to the indication field comprises:

taking the time domain resource indicated by the indication field as the time domain resource of the target transmission corresponding to the downlink control channel; or determining an uplink resource and/or a downlink resource in the target time unit in which the target transmission is located, according to the indication field, and taking all or part of the uplink resources or the downlink resources as the time domain resource of the target transmission; or taking all or part of resources pre-agreed or pre-configured for data transmission in the uplink resources or the downlink resources, as the time domain resource of the target transmission; or determining the time domain resource of the target transmission according to the time domain resource indicated by the indication field and the division of uplink resources and downlink resources in the target time unit.

3. The data transmission method according to claim 2, wherein the step of determining the time domain resource of the target transmission according to the time domain resource indicated by the indication field and the division of uplink resources and downlink resources in the target time unit comprises:

taking a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or taking a maximum value, a minimum value, an intersection set, or a union set of: i) all or part of time domain resources pre-agreed or pre-configured for data transmission in the uplink resources or the downlink resources, and ii) the time domain resource indicated by the indication field, as the time domain resource of the target transmission; or when the time domain resource indicated by the indication field does not exceed the size of the uplink resource or the downlink resource determined according to the indication field, or does not exceed the size of an area pre-agreed or pre-configured for data transmission in the uplink resource or the downlink resource determined according to the indication field, then taking the time domain resource indicated by the indication field as the time domain resource of the target transmission; or when the time domain resource indicated by the indication field exceeds the size of the uplink resource or the downlink resource determined according to the indication field, then taking the uplink resource or the downlink resource as the time domain resource of the target transmission, or taking the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or when the time domain resource indicated by the indication field exceeds the size of an area pre-agreed or pre-configured for data transmission in the uplink resource or the downlink resource determined according to the indication field, then taking the area pre-agreed or pre-configured for data transmission in the uplink resource or the downlink resource as the time domain resource of the target transmission, or taking the time domain resource indicated by the indication field as the time domain resource of the target transmission, or taking a maximum value, a minimum value, an intersection set or a union set of the area pre-agreed or pre-configured for data transmission in the uplink resource or the downlink resource and the time domain resource indicated by the indication field as the time domain resource of the target transmission.

4. The data transmission method according to claim 1, wherein the target transmission corresponding to the downlink control channel comprises:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format; and/or, wherein the target time unit is one of the following time units: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel; and/or, wherein the time domain resource indicated by the indication field comprises one or more types of the following information:

the number of symbols, a symbol location, the number of mini-slots, a mini-slot location, the number of slots, a slot location, the number of sub-frames, and a sub-frame location;

wherein the mini-slot is a unit occupying X symbols, and X is an integer greater than or equal to 1.

5. A data transmission method which is applied to a base station, the method comprising:
transmitting a downlink control channel carrying an indication field, wherein the indication field is used for indicating a time domain resource of a target transmission corresponding to the downlink control channel, and indicating division of uplink resources and downlink resources in a target time unit in which the target transmission is located, or the indication field is used for indicating division of uplink resources and downlink resources in a target time unit in which a target transmission corresponding to the downlink control channel is located; wherein the target time unit is one slot;
determining the time domain resource of the target transmission corresponding to the downlink control channel, according to the indication field; and
transmitting data on the time domain resource;
wherein the division of uplink resources and downlink resources in the target time unit in which the target transmission is located indicated by the indication field comprises:
or at least two of: resource information of the downlink resource in the target time unit in which the target transmission is located, resource information of the uplink resource in the target time unit in which the target transmission is located, and resource information of a guard period (GP), wherein the resource information comprises the size and/or location of the resource.

6. The data transmission method according to claim 5,
wherein the indication field is only used for indicating division of uplink resources and downlink resources in the target time unit in which the target transmission is located;
the step of determining the time domain resource of the target transmission corresponding to the downlink control channel according to the indication field comprises:
determining an uplink resource and/or a downlink resource in the target time unit in which the target transmission is located, according to the indication field; and
taking all or part of the uplink resources or the downlink resources as the time domain resource of the target transmission; or taking all or part of resources pre-agreed or pre-configured for data transmission in the uplink resources or the downlink resources, as the time domain resource of the target transmission; or,
wherein the indication field is used for indicating the time domain resource of the target transmission corresponding to the downlink control channel, and indicating division of uplink resources and downlink resources in the target time unit in which the target transmission is located;
the step of determining the time domain resource of the target transmission corresponding to the downlink control channel according to the indication field comprises:
taking the time domain resource indicated by the indication field as the time domain resource of the target transmission corresponding to the downlink control channel; or
determining an uplink resource and/or a downlink resource in the target time unit in which the target transmission is located, according to the indication field, and taking all or part of the uplink resources or the downlink resources as the time domain resource of the target transmission; or taking all or part of resources pre-agreed or pre-configured for data transmission in the uplink resources or the downlink resources, as the time domain resource of the target transmission; or
determining the time domain resource of the target transmission according to the time domain resource indicated by the indication field and the division of uplink resources and downlink resources in the target time unit.

7. The data transmission method according to claim 6, wherein the step of determining the time domain resource of the target transmission according to the time domain resource indicated by the indication field and the division of uplink resources and downlink resources in the target time unit comprises:
taking a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or
taking a maximum value, a minimum value, an intersection set, or a union set of: i) all or part of time domain resources pre-agreed or pre-configured for data transmission in the uplink resources or the downlink resources, and ii) the time domain resource indicated by the indication field, as the time domain resource of the target transmission; or
when the time domain resource indicated by the indication field does not exceed the size of the uplink resource or the downlink resource determined according to the indication field, or does not exceed the size of an area pre-agreed or pre-configured for data transmission in the uplink resource or the downlink resource determined according to the indication field, then taking the time domain resource indicated by the indication field as the time domain resource of the target transmission; or
when the time domain resource indicated by the indication field exceeds the size of the uplink resource or the downlink resource determined according to the indication field, then taking the uplink resource or the downlink resource as the time domain resource of the target transmission, or taking the time domain resource indicated by the indication field as the time domain resource of the target transmission, or taking a maximum value, a minimum value, an intersection set or a union set of the uplink resource or the downlink resource and the time domain resource indicated by the indication field as the time domain resource of the target transmission; or
when the time domain resource indicated by the indication field exceeds the size of an area pre-agreed or pre-configured for data transmission in the uplink resource or the downlink resource determined according to the indication field, then taking the area pre-agreed or pre-configured for data transmission in the uplink resource or the downlink resource as the time domain resource of the target transmission, or taking the time domain resource indicated by the indication field as the time domain resource of the target transmission, or taking a maximum value, a minimum value, an intersection set or a union set of the area pre-agreed or pre-configured for data transmission in the uplink resource or the downlink resource and the time domain resource indicated by the indication field as the time domain resource of the target transmission.

8. The data transmission method according to claim 5, wherein the target transmission corresponding to the downlink control channel comprises:
the target transmission corresponding to the downlink control channel being an uplink shared channel transmission scheduled by the downlink control channel, when a DCI format used by the downlink control channel is an uplink DCI format; or
the target transmission corresponding to the downlink control channel being a downlink shared channel transmission scheduled by the downlink control channel, when a DCI format used by the downlink control channel is a downlink DCI format; or
the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format; and/or,
wherein the target time unit is one of the following time units: a current time unit in which the downlink control channel transmission is located, an A1-th time unit after the current time unit, A2 continuous time units starting from the current time unit and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel; and/or,
wherein the time domain resource indicated by the indication field comprises one or more types of the following information:
the number of symbols, a symbol location, the number of mini-slots, a mini-slot location, the number of slots, a slot location, the number of sub-frames, and a sub-frame location;
the mini-slot is a unit occupying X symbols, and X is an integer greater than or equal to 1.

9. A terminal, comprising: a transceiver, a processor, and a memory, wherein:
the processor is configured to execute a computer program stored in the memory so as to implement functions of following modules:
a receiving module, configured to receive a downlink control channel carrying an indication field, wherein the indication field is used for indicating a time domain resource of a target transmission corresponding to the downlink control channel, and indicating division of uplink resources and downlink resources in a target time unit in which the target transmission is located, or, the indication field is used for indicating division of uplink resources and downlink resources in a target time unit in which a target transmission corresponding to the downlink control channel is located; wherein the target time unit is one slot;
a first determining module, configured to determine the time domain resource of the target transmission corresponding to the downlink control channel, according to the indication field; and
a first transmission module, configured to transmit data on the time domain resource;
wherein the division of uplink resources and downlink resources in the target time unit in which the target transmission is located indicated by the indication field comprises:
at least two of: resource information of the downlink resource in the target time unit in which the target transmission is located, resource information of the uplink resource in the target time unit in which the target transmission is located, and resource information of a guard period (GP) wherein the resource information comprises the size and/or location of the resource.

10. The terminal according to claim 9,
wherein the indication field is only used for indicating division of uplink resources and downlink resources in the target time unit in which the target transmission is located;
the first determining module comprises:
a second determining sub-module, configured to determine an uplink resource and/or a downlink resource in the target time unit in which the target transmission is located, according to the indication field; and
a third determining sub-module, configured to take all or part of the uplink resources or the downlink resources as the time domain resource of the target transmission; or take all or part of resources pre-agreed or pre-configured for data transmission in the uplink resources or the downlink resources, as the time domain resource of the target transmission; or,
wherein the indication field is used for indicating the time domain resource of the target transmission corresponding to the downlink control channel, and indicating division of uplink resources and downlink resources in the target time unit in which the target transmission is located;
the first determining module comprises:
a fourth determining sub-module, configured to take the time domain resource indicated by the indication field as the time domain resource of the target transmission corresponding to the downlink control channel; or
a fifth determining sub-module, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or pre-configured for data transmission in the uplink resources or the downlink resources, as the time domain resource of the target transmission; or
a sixth determining sub-module, configured to determine the time domain resource of the target transmission according to the time domain resource indicated by the indication field and the division of uplink resources and downlink resources in the target time unit.

11. The terminal according to claim 10, wherein the sixth determining sub-module comprises:
a first determining unit, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or,
a second determining unit, configured to take a maximum value, a minimum value, an intersection set, or a union set of: i) all or part of time domain resources pre-agreed or pre-configured for data transmission in the uplink resources or the downlink resources, and ii) the time domain resource indicated by the indication field, as the time domain resource of the target transmission; or a third determining unit configured to: when the time domain resource indicated by the indication field does not exceed the size of the uplink resource or the downlink resource determined according to the indication field, or does not exceed the size of an area pre-agreed or pre-configured for data transmission in the uplink resource or the downlink resource determined according to the indication field, then take the time domain resource indicated by the indication field as the time domain resource of the target transmission; or a fourth determining unit configured to: when the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or take a maximum value, a minimum value, an intersection set or a union set of the uplink resource or the downlink resource and the time domain resource indicated by the indication field as the time domain resource of the target transmission; or a fifth determining unit configured to: when the time domain resource indicated by the indication field exceeds the size of an area pre-agreed or c pre-configured for data transmission in the uplink resource or the downlink resource determined according to the indication field, then take the area pre-agreed or pre-configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or pre-configured for data transmission in the uplink resource or the downlink resource and the time domain resource indicated by the indication field as the time domain resource of the target transmission.

12. The terminal according to claim 9, wherein the target transmission corresponding to the downlink control channel comprises:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format; and/or, wherein the target time unit is one of the following time units: a current time unit in which the downlink control channel transmission is located, an A1-th time unit after the current time unit, and A2 continuous time units starting from the current time unit or A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel; and/or, wherein the time domain resource indicated by the indication field comprises one or more types of the following information:

the number of symbols, a symbol location, the number of mini-slots, a mini-slot location, the number of slots, a slot location, the number of sub-frames, and a sub-frame location; and the mini-slot is a unit occupying X symbols, and X is an integer greater than or equal to 1.

13. A base station, comprising: a transceiver, a processor, and a memory, wherein:

the processor is configured to execute a computer program stored in the memory so as to implement functions of following modules:

a transmitting module, configured to transmit a downlink control channel carrying an indication field, wherein the indication field is used for indicating a time domain resource of a target transmission corresponding to the downlink control channel, and indicating division of uplink resources and downlink resources in a target time unit in which the target transmission is located, or, the indication field is used for indicating division of uplink resources and downlink resources in a target time unit in which a target transmission corresponding to the downlink control channel is located; wherein the target time unit is one slot;

a second determining module, configured to determine the time domain resource of the target transmission corresponding to the downlink control channel, according to the indication field; and a second transmission module, configured to transmit data on the time domain resource;

wherein the division of uplink resources and downlink resources in the target time unit in which the target transmission is located indicated by the indication field comprises:

at least two of: resource information of the downlink resource in the target time unit in which the target transmission is located, resource information of the uplink resource in the target time unit in which the target transmission is located, and resource information of a guard period (GP), wherein the resource information comprises the size and/or location of the resource.

14. The base station according to claim 13, wherein the indication field is only used for indicating division of uplink resources and downlink resources in the target time unit in which the target transmission is located;

the second determining module comprises:

an eighth determining sub-module, configured to determine an uplink resource and/or a downlink resource in the target time unit in which the target transmission is located, according to the indication field; and a ninth determining sub-module, configured to take all or part of the uplink resources or the downlink resources as the time domain resource of the target transmission; or take all or part of resources pre-agreed or pre-configured for data transmission in the uplink resources or the downlink resources, as the time domain resource of the target transmission; or, wherein the indication field is used for indicating the time domain resource of the target transmission corresponding to the downlink control channel, and indicating division of uplink resources and downlink resources in the target time unit in which the target transmission is located;

the second determining module comprises:

a tenth determining sub-module, configured to take the time domain resource indicated by the indication field as the time domain resource of the target transmission corresponding to the downlink control channel; or an eleventh determining sub-module, configured to determine an uplink resource and/or a downlink resource in the target time unit in which the target transmission is located, according to the indication field, and take all or part of the uplink resources or the downlink resources as the time domain resource of the target transmission; or take all or part of resources pre-agreed or pre-configured for data transmission in the uplink resources or the downlink resources, as the time domain resource of the target transmission; or a twelfth determining sub-module, configured to determine the time domain resource of the target transmission according to the time domain resource indicated by the indication field and the division of uplink resources and downlink resources in the target time unit.

15. The base station according to claim 14, wherein the twelfth determining sub-module comprises:

a sixth determining unit, configured to take a maximum value, a minimum value, an intersection set, or a union set of: i) all or part of the time domain resources of the uplink resources or the downlink resources determined according to the indication field, and ii) the time domain resource indicated by the indication field, as the time domain resource of the target transmission; or a seventh determining unit, configured to take a maximum value, a minimum value, an intersection set, or a union set of: i) all or part of time domain resources pre-agreed or pre-configured for data transmission in the uplink resources or the downlink resources, and ii) the time domain resource indicated by the indication field, as the time domain resource of the target transmission; or, an eighth determining unit configured to: when the time domain resource indicated by the indication field does not exceed the size of the uplink resource or the downlink resource determined according to the indication field, or does not exceed the size of an area pre-agreed or pre-configured for data transmission in the uplink resource or the downlink resource determined according to the indication field, then take the time domain resource indicated by the indication field as the time domain resource of the target transmission; or a ninth determining unit configured to: when the time domain resource indicated by the indication field exceeds the size of the uplink resource or the downlink resource determined according to the indication field, then take the uplink resource or the downlink resource as the time domain resource of the target transmission, or take the time domain resource indicated by the indication field as the time domain resource of the target transmission, or take a maximum value, a minimum value, an intersection set or a union set of the uplink resource or the downlink resource and the time domain resource indicated by the indication field as the time domain resource of the target transmission; or a tenth determining unit configured to: when the time domain resource indicated by the indication field exceeds the size of an area pre-agreed or pre-configured for data transmission in the uplink resource or the downlink resource determined according to the indication field, then take the area pre-agreed or pre-configured for data transmission in the uplink resource or the downlink resource as the time domain resource of the target transmission, or take the time domain resource indicated by the indication field as the time domain resource of the target transmission, or take a maximum value, a minimum value, an intersection set or a union set of the area pre-agreed or pre-configured for data transmission in the uplink resource or the downlink resource and the time domain resource indicated by the indication field as the time domain resource of the target transmission.

16. The base station according to claim 13, wherein the target transmission corresponding to the downlink control channel comprises:

the target transmission corresponding to the downlink control channel being an uplink shared channel transmission scheduled by the downlink control channel, when a DCI format used by the downlink control channel is an uplink DCI format; or the target transmission corresponding to the downlink control channel being a downlink shared channel transmission scheduled by the downlink control channel, when a DCI format used by the downlink control channel is a downlink DCI format; or the target transmission corresponding to the downlink control channel being an ACK/NACK feedback corresponding to a downlink shared channel scheduled by the downlink control channel or an ACK/NACK feedback corresponding to the downlink control channel, when a DCI format used by the downlink control channel is a downlink DCI format; and/or, wherein the target time unit is one of the following time units: a current time unit in which the downlink control channel transmission is located, an A1-th time unit after the current time unit, A2 continuous time units starting from the current time unit, and A3 continuous time units after the current time unit, wherein each of A1, A2 and A3 is an integer greater than or equal to 1, and A1, A2 and A3 are determined based on a pre-agreed rule, or based on a configuration of high layer signaling, or based on an indication field in the downlink control channel; and/or, wherein the time domain resource indicated by the indication field comprises one or more types of the following information:

the number of symbols, a symbol location, the number of mini-slots, a mini-slot location, the number of slots, a slot location, the number of sub-frames, and a sub-frame location;

wherein the mini-slot is a unit occupying X symbols, and X is an integer greater than or equal to 1.

* * * * *